(12) United States Patent
Stewart

(10) Patent No.: US 11,853,974 B2
(45) Date of Patent: Dec. 26, 2023

(54) APPARATUSES AND METHODS FOR ASSORTER QUANTIFICATION

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

( * ) Notice: Subject to any disclaimer, the term of this patent is extended or adjusted under 35 U.S.C. 154(b) by 0 days.

(21) Appl. No.: 17/695,234

(22) Filed: Mar. 15, 2022

(65) Prior Publication Data

US 2023/0297967 A1    Sep. 21, 2023

(51) Int. Cl.
*G06Q 10/1053* (2023.01)
*G06Q 10/1091* (2023.01)
*G06Q 10/0631* (2023.01)

(52) U.S. Cl.
CPC .  *G06Q 10/1091* (2013.01); *G06Q 10/063114* (2013.01); *G06Q 10/1053* (2013.01); *G06Q 2220/00* (2013.01)

(58) Field of Classification Search
CPC ........................ G06Q 10/1053; G06Q 2220/00
See application file for complete search history.

(56) References Cited

U.S. PATENT DOCUMENTS

| | | | | |
|---|---|---|---|---|
| 2009/0138342 A1* | 5/2009 | Otto | ....................... | G06Q 30/02 706/45 |
| 2011/0137816 A1* | 6/2011 | Kornblum | .......... | G06Q 10/1053 705/321 |
| 2013/0226813 A1* | 8/2013 | Voltz | .................. | G06Q 20/4014 705/67 |
| 2014/0313007 A1* | 10/2014 | Harding | ................... | G07C 9/37 340/5.52 |
| 2015/0199775 A1* | 7/2015 | Pfeiffer | ............ | G06Q 10/06398 705/7.42 |
| 2016/0132909 A1* | 5/2016 | Guidi | ..................... | G06Q 30/01 705/7.31 |
| 2020/0272996 A1 | 8/2020 | Rahman | | |
| 2021/0026835 A1* | 1/2021 | Pai | ........................ | G06F 40/295 |
| 2021/0037000 A1* | 2/2021 | Attard | ................... | H04L 63/102 |
| 2021/0065128 A1* | 3/2021 | Shao | ....................... | G06N 20/00 |
| 2021/0279688 A1 | 9/2021 | Boddapu | | |
| 2021/0342787 A1 | 11/2021 | Williams | | |
| 2021/0357870 A1 | 11/2021 | Joao | | |
| 2021/0365867 A1 | 11/2021 | Kim | | |
| 2022/0006813 A1* | 1/2022 | Jorasch | ................... | G06F 3/015 |
| 2022/0114522 A1* | 4/2022 | Cardoso | .......... | G06Q 10/06311 |
| 2022/0180416 A1* | 6/2022 | Shook | ................ | G06Q 30/0611 |

OTHER PUBLICATIONS

Priest, Colin, "Using Fuzzy Matching Plus Artificial Intelligence to Identify Duplicate Customers," [online], DataRobot.com, published Jun. 7, 2018, available at: < https://www.datarobot.com/blog/using-fuzzy-matching-plus-artificial-intelligence-to-identify-duplicate-customers/ > (Year: 2018).*

* cited by examiner

*Primary Examiner* — Richard W. Crandall
(74) *Attorney, Agent, or Firm* — Caldwell Intellectual Property Law, LLC

(57) ABSTRACT

An apparatus and method for assorter quantification. The apparatus includes a processor that is configured to track a candidate through the recruiting process such that an assorter may be compensated for their recruiting efforts. The apparatus includes receiving data sets from the assorter and the employer and determining a quantification amount for assortment activities by the assorter.

19 Claims, 9 Drawing Sheets

APPARATUSES AND METHODS FOR ASSORTER QUANTIFICATION

FIELD OF THE INVENTION

The present invention generally relates to the field of human resource technology. In particular, the present invention is directed to apparatuses and methods for assorter quantification.

BACKGROUND

Assorters often find and screen prospective candidates for an employer. There is a need for means to securely track candidates through a recruitment process and facilitate actions between an assorter and an endpoint.

SUMMARY OF THE DISCLOSURE

In an aspect, an apparatus for assorter quantification, the apparatus including at least a processor, and a memory communicatively connected to the at least a processor and including instructions configuring the at least a processor to receive an assorter-linked data set associated with an assorter and an endpoint-linked data set associated with an endpoint, identify an assortment activity as a function of the assorter-linked data set and the endpoint-linked data set, and determine a quantification action as a function of the assortment activity.

In another aspect, a method for assorter quantification includes receiving, by a processor, an assorter-linked data set associated with an assorter and an endpoint-linked data set associated with an endpoint, identifying, by the processor, an assortment activity as a function of the assorter-linked data set and the endpoint-linked data set, and determining, by the processor, a quantification action as a function of the assortment activity, wherein quantification action comprises transferring a payment to the assorter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
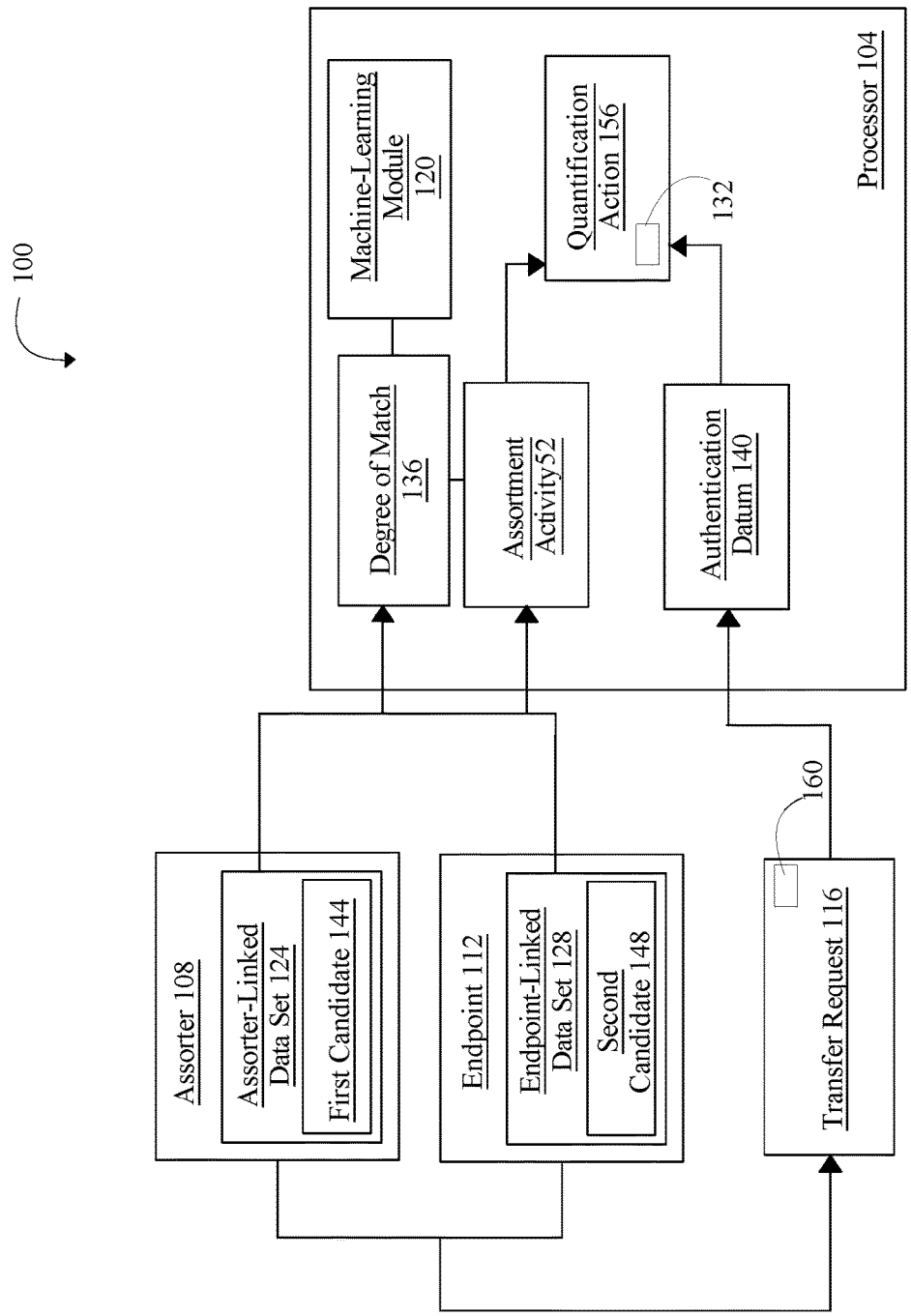
FIG. 1 is a block diagram illustrating an exemplary embodiment of an apparatus for candidate tracking in accordance with one or more embodiments of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for compensating assortment activity. More specifically, the present disclosure may be directed at determining assorter quantification. In various embodiment, candidate tracking may include monitoring recruiting action by an assorter, such as a recruiter. In some cases, a candidate may be tracked by an employer and an assorter in two data sets and then the two data sets may be compared for similarities. Quantification may then be awarded to the assorter as a function of the assortment activity.

Aspects of the present disclosure can be used to compensate an assorter for finding and recruiting a candidate. Aspects of the present disclosure may prevent employers from acting in bad faith. Exemplary embodiments illustrating aspects of the present disclosure are described below in the context of several specific examples.

In an embodiment, methods and apparatuses described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point −A as the point with negative y-coordinates, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments of apparatus and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described in further detail below, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for assorter quantification is shown. System includes a processor 104. Processor 104 may include any processor and/or computing device as described in this disclosure, including without limitation a microcontroller, microprocessor, digital signal processor (DSP), and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of processor 104, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is configured to receive an assorter-linked data set 124 associated with an assorter 108. Assorter-linked data set 124 may also be associated with a first candidate 144 for the purposes of tracking a recruitment process of first candidate 144 and an involvement of the assorter in the recruiting process, as discussed further in this disclosure. As used in this disclosure, an "assorter" is an entity that assists in acquiring and placing candidates. In some embodiments, an assorter may be, for example, a job recruiter. Assorters often work with employers to decide on potential candidates. An employer may be an example of an endpoint. As used in this disclosure, an "endpoint" is an entity that hires a candidate. In an embodiment, an endpoint 112 may be a person, firm, company, or other entity that hires and pays a person to do a job. As used in this disclosure, a "candidate" is a prospective user that is looking to be employed by endpoint 112. A candidate may be sought out by an assorter 108 on behalf of endpoint 112. For example, and without limitation, endpoint 112 may hire assorter 108 to find a candidate to fill a particular job position offered by endpoint 112. Assorter 108 may seek out a candidate or determine a capability of a candidate with an endpoint using a resume, which may be a video or written resume. As used in this disclosure, an "assorter-linked data set" is a collection of data and/or information related to a candidate that a assorter has found. Assorter-linked data set 124 may include information assorter 108 has gathered on candidate through, for example, interviews. Assorter-linked data set 124 may include a video, audio, and/or written record of a candidate. As used in this disclosure, a "record" is an item of media that includes content representative or communicative of a jobseeker, such as a candidate. A record may include a resume. A record may include personally identifiable information about a job seeker such as the jobseeker's name, address, phone number, and the like. A record may include information about a jobseeker's employment history, education, skills, and the like. In nonlimiting embodiments, a record may include a video resume. A "video resume", as used in this disclosure, is a resume that represents a jobseeker directly, in person, by video. A video resume may be any video in visual and/or audio form to provide a recording promoting a jobseeker. Application data may include visual content such that user-specific historical record may include visual content. Visual content may be in the form of written content or a video. Video may include visual content that is non-verbal. For example, and without limitation, video may include change in intonation and/or stress in speaker's voice, expression of emotion, interjection, and the like. An assorter-linked data set 124 may be posted on an immutable sequential listing.

In one or more embodiments, an immutable sequential listing 200 may include blocks containing entries of data. For example, and without limitation, assorter-linked data set 124 may have blocks representing candidate's (also referred to in this disclosure as an "applicant") record, the progress of the candidate through the recruitment process, and the like. In an embodiment, a recruitment process may include blocks representing the candidate passing different interviews (i.e. the assorter screening, the hiring manager interview, and the like.), test results for personality tests, skills assessment tests, job knowledge tests, and the like. Entries of data may also comprise of records of transactions, such as Bitcoin transactions, or other payment transactions. Additionally, entries of data may comprise of files, such as JPEGs, documents, spreadsheets, videos, pictures, etc. Blocks of immutable sequential listing 200 may be hashed and encoded into a Merkle tree. In an embodiment, each block includes a cryptographic hash of the prior block, linking the blocks and creating a chain. The top of the Merkle tree may comprise a Merkle root that may include a cryptographic accumulator 300. Immutable sequential listing 200 may include a cryptographic accumulator 300, which is discussed in further detail in FIG. 3. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set.

Continuing to reference FIG. 1, processor 104 is also configured to receive an endpoint-linked data set 128 associated with endpoint 112. Endpoint-linked data set 128 may also be associated with a second candidate 148. As used in this disclosure, a "endpoint-linked data set" is a collection of data and/or information related to a candidate that an employer has interacted with during a hiring process. For example, and without limitation, endpoint-linked data set 128 may include information related to a candidate that endpoint 112 has interviewed for an open position working for endpoint 112. In another example, and without limitation, endpoint-linked data 128 set may include information related to a candidate that endpoint has recently hired. In an embodiment, endpoint-linked data set 128 may contain information similar to the assorter-linked data set 124, such as a resume of candidate, records of the recruitment process for the candidate, and the like. Recruitment process records may include information collected from one or more tests a candidate has taken, interviews a candidate has taken, and the like. Endpoint-linked data set 128 may be stored on an immutable sequential listing and managed by an endpoint 112. Endpoint 112 may digitally sign the endpoint-linked data set 128, whereas an assorter 108 may digitally sign the assorter-linked data set 124. In an embodiment, endpoint 112 may hold the private key to the endpoint-linked data set 128. In another embodiment, assorter 108 may hold the private key to the assorter-linked data set 124.

With continued reference to FIG. 1, processor 104 is configured to identify an assortment activity 152 as a function of assorter-linked data set 124 and endpoint-linked data set 128. For the purposes of this disclosure, an "assortment activity" is a direct or indirect act of an assorter that assisted an endpoint in a hiring or networking process. For example, and without limitation, assortment activity 152 may include making a referral, providing a reference, inviting an individual, such as a candidate or endpoint, into a particular network and/or platform, making a hire, finding a candidate for an endpoint, hiring a candidate on behalf of endpoint, and the like. Data related to assortment activity 152 may be stored on a blockchain, as discussed further in this disclosure. In one or more embodiments, identifying assortment activity 152 may include monitoring assortment activity 152, where assorter-linked data set 124 and/or endpoint-linked data set 128 are continuously monitored, for example, in real-time, so that one or more assortment activities may be determined at any time and collected for future reference. In one or more embodiments, assortment activity 152 may be autonomously monitored. In other embodiments, assortment activity 152 may be identified upon receipt of a transfer request 116, as discussed below.

Still referring to FIG. 1, processor 104 may be configured to receive and/or process transfer request 116. As used in this disclosure, a "transfer request" is a request from assorter 108 to endpoint 112 requesting a quantification action be completed by endpoint 112. A "quantification action", as used herein, is a payment or reward provided by endpoint to an assorter for assortment activity that benefitted endpoint during a job-related process, such as a hiring process. In nonlimiting embodiments, quantification may include compensation, such as, for example, monetary compensation. For instance, and without limitation, a transfer request may be submitted by assorter 108 if assortment activity 152 resulted in endpoint 112 hiring a candidate that assorter referred to endpoint 112, where a corresponding quantification action may include endpoint 112 paying assorter 108 for assortment activity 152 by monetary means.

In various embodiments, a locked and/or contingent payment may be stored on a blockchain, where the payment is locked in a deposit. The payment may be secured and released upon terms of, for example, a contract or agreement, being met. For example, payment may be released and/or unlocked upon an assorter's completion of a specified assortment activity. Upon completion of the specified assortment activity, the payment is unlocked and released to the assorter. Locked payments may include multi-hop locks for blockchain where several payments may occur without the need for additional blockchain transactions. For instance, and without limitation, various assortment activities, such as milestones, may each release a different locked payment on the blockchain. For example, and without limitation, if an assorter finds a candidate for endpoint that endpoint hires, then a payment may be released to assorter. If the employee found by the assorter stays employed by the endpoint for more than six months, then assorter may receive an additional payment that is released upon the time requirement of six months being reached.

In various embodiments, locked payments may be stored as cryptocurrency on a blockchain. Locked payment being stored on blockchain so that endpoint may make a singular payment that may be released as one or more payments one or more corresponding specified assortment activities by assorter and/or benefits received by endpoint. If assorter, for example, only meets one specified assortment activities out of a plurality of specified assortment activities, then the remaining payment may be returned to endpoint.

In one or more embodiments, processor 104 is configured to determine a quantification action 156 as a function of assortment activity 152. Determining a quantification action 156 may include, for example and without limitation, determining a payment amount owed to assorter 108 in exchange for one or more confirmed assortment activities completed by assorter 108 for endpoint 112. Once a quantification action 156 is determined, then processor 104 may initiate the quantification action by, for example and without limitation, transferring and/or releasing a payment to assorter 108. In one or more non-limiting embodiments, quantification action 156 may include transferring a payment, transferring resources, transferring assets, and the like. In an embodiment, quantification action 152 may include quantification data 132. Quantification data 132 may include a quantitative and/or qualitative payment, such as a payment amount, accepted by assorter 108 and endpoint 112. For example, and without limitation, quantification data 132 may include a fee amount that endpoint 112 agreed to pay for provided assortment activities by assorter 108. In one or more embodiments, quantification action 156 may include a transaction, such as an exchange of money for actions completed by assorter 108, such as finding a candidate that can be hired on as an employee by endpoint. Quantification may include an item of monetary value (e.g., cryptocurrency, cash, credit, and the like). A quantification amount may be determined based on various factors, such as a quantity of references provided by assorter 108 to endpoint 112, truthfulness of a reference and/or verification of an event, an acceptance of a sent network invitation, and the like. In some embodiments, quantification may be linked to an accuracy and/or truthfulness of an assortment activity. For example, and without limitation, assortment activity such as providing a reference for a jobseeker may be verified to determine if the person providing the reference and the job seeker actually did work together and for how long of a time frame that they did indeed work together. In various embodiments, a more accurate assortment activity that can be verified as being truthful may be more generously rewarded, while assortment activity that is untruthful may be less generously rewarded.

Figure 4:
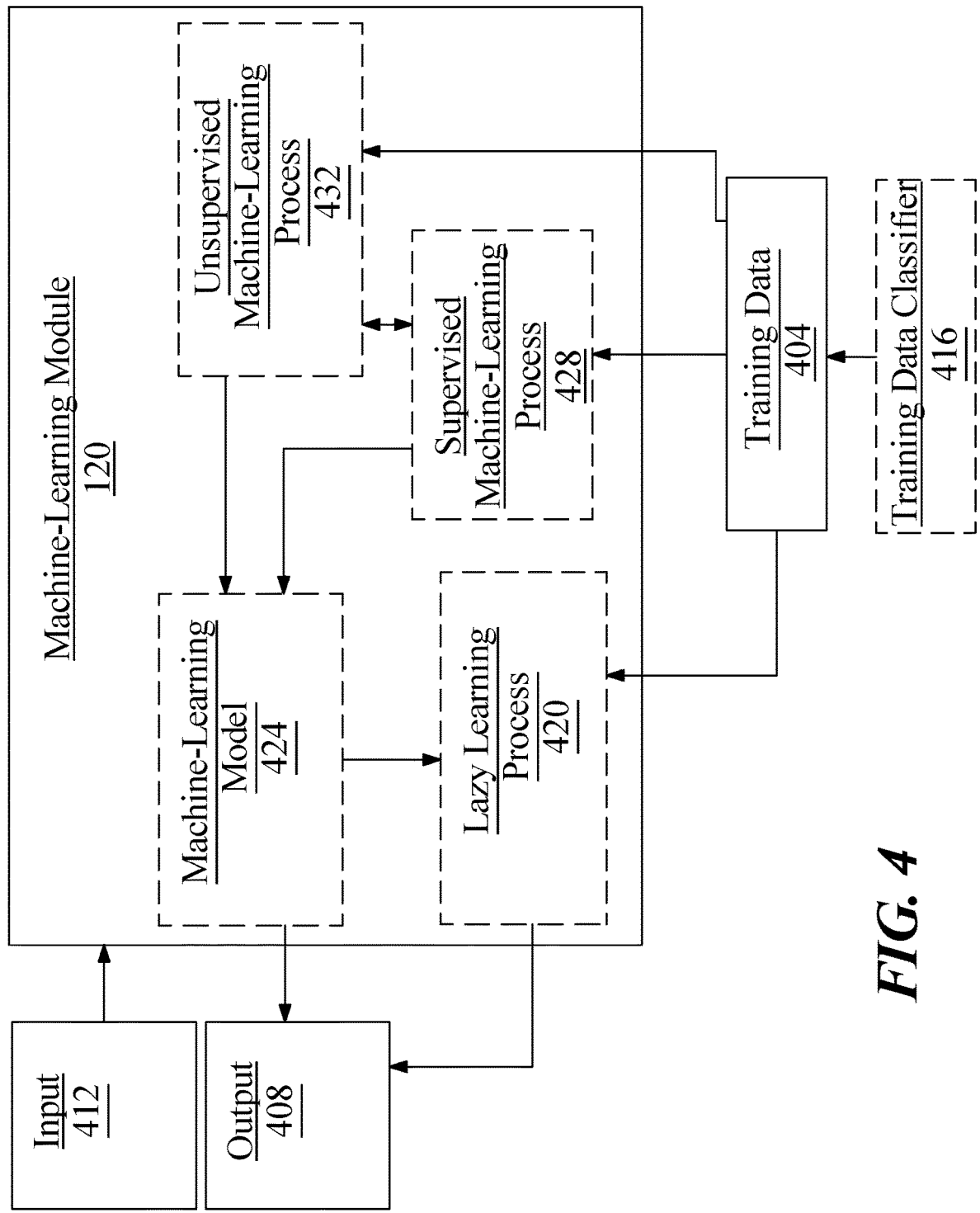
FIG. 4 is a block diagram of exemplary machine-learning processes in accordance with one or more embodiments of the present disclosure.

In one or more embodiments, quantification data 132 and/or degree of match 136 may be generated using a machine-learning module, discussed in further detail in FIG. 4. For example, and without limitation, machine-learning module 120 may use a classifier to determine degree of match 136. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. In an embodiment, processer may use a data classifier. As used in this disclosure, a "data classifier" is identifying indicia relating to the quantification data, for example, education level, traits, skills, jobs. In an embodiment, processor 104 may classify degree of match data into categories associated with jobs, education level, types of certifications, experience related to different degrees, and the like. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby a processor 104 derives a classifier from training data. In an embodiment, training data may be made up of a plurality of training examples that each include examples of data to be inputted into the machine-learning module 120, such as experience associated with types of jobs, jobs associated with different degrees (like a mechanical engineering job for a degree in mechanical engineering), etc., and examples of data to be output therefrom, such as data sets that include job history associated with different degrees, experience history associated with a job, etc. Training data may be implemented in any manner discussed below. Training data may be obtained from and/or in the form of previous data set categorization. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In one or more embodiments, a classifier may classify indicia to a calculator that may determine a quantification amount. In some embodiments, calculator may include a supervised machine-learning model. In other embodiments, data may be inputted into fuzzy inferencing system, where membership in fuzzy sets is determined by the indicia. Outputs may be created by defuzzification of membership in one or more compensation level fuzzy sets and/or by mapping to a Takagi-Sugeno-Kang (TSK) function, which may be tuned using a supervised machine-learning process, as discussed further below in this disclosure. Similarly, a machine-learning model may be used to determine quantification action, as discussed further below.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷B(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent Still referring to FIG. 1, processor 104 may be configured to determine a degree of match 136 as a function of assorter-linked data set 124 and the endpoint-linked data set 128. In an embodiment, after transfer request 116 is received by, for example, assorter 108, along with the assorter-linked and endpoint-linked data sets, processor 104 may determine degree of match 136 between assorter-linked data set 124 and endpoint-linked data set 128. As used herein, a "degree of match" is a measure of similarity between an assorter-linked data set and an endpoint-linked data set. Degree of match 136 may be used to identify if a second candidate 148 of endpoint-linked data set 128 is the same candidate as first candidate 144 of assorter-linked data set 124. In an embodiment, determining degree of match 136 between the two data sets is to ensure that the assorter 108 and the endpoint 112 are referring to the same candidate. Processor 104 may be prompted to determine that assorter 108 and endpoint 112 are referring to the same candidate upon receiving transfer request 116. If first candidate 144 and second candidate 148 are identified as the same candidate, then a quantification action 156 is initiated so that assorter 108 receives a form of payment for assortment activities 152 by assorter 108 that was conducted for endpoint 112. Quantification datum 132 includes a quantitate or qualitative description of quantification to be received by assorter 108 for assortment activity 152, such as, for example, finding a prospective candidate that is ultimately hired by endpoint 112.

In one or more nonlimiting embodiments, determination of degree of match 136 between data sets 124,128 may include identifying and matching a candidate from a video resume. In an embodiment, processor 104 may be configured to compare the video resume in the assorter-linked data set 124 with the video resume in the endpoint-linked data set 128. An initial pass may be used by processor 104 to sort elements of video resumes into categories, and a subsequent pass may involve detailed comparison of category-matched video elements from at least two video resumes to one another. For example, the initial pass may include classifying the resumes based on image component, audio component, attributes, or at least identifying subject indicia. For example, an image component may include an image of the subject. As used in this disclosure, an "image component" may be a visual representation of information, such as a plurality of temporally sequential frames and/or pictures. As used in this disclosure, an "audio component" is a representation of audio, for example a sound, a speech, and the like. Attributes may include candidate's skills, competencies, credentials, talents, and the like. In some cases, attributes may be explicitly conveyed within video resume. Alternatively, or additionally, in some cases, attributes may be conveyed implicitly with video resume. For example, identifying indicia could include name of candidate, account number, social security number, telephone number, address, and the like. In some embodiments, processor 104 may utilize a candidate classifier, which may include any classifier used throughout this disclosure, to run an initial pass over the video elements of video resumes, break down and categorizes such elements before comparing it to another video resume. As used in this disclosure, a "candidate classifier" is a classifier that classifies assorter-linked data set 124 and/or data contained therein, which may include video resume, to endpoint-linked data set 128 and/or data contained therein, which may also include a video resume (or vise versa). In some cases, candidate classifier may include a trained machine-learning model, which is trained using candidate training data. As used in this disclosure, "candidate training data" is a training data that correlates one or more of candidates, candidate-specific data, and candidate attributes to one or more job descriptions, description-specific data, and job description data. As used in this disclosure, a "job description datum" is an element of information associated with a job description. Video resume may be representative of such job descriptive data. For example, in the initial pass, video resumes may be categorized based on candidate's attributes such as credentials. As used in this disclosure, "credentials" are any piece of information that indicates an individual's qualification to perform a certain task or job. Video resumes may be grouped based on level of experience, educational history, certifications, and the like.

Still referring to FIG. 1, after initial pass, during the subsequent pass, video resumes may be compared against one another and ranked based on similarity before an overall comparison result is computed. After the initial and subsequent pass have been performed, processor 104 may utilize the data gathered from the candidate classifier to calculate an overall comparison score of the video resumes. Comparison between video resumes may be one of many examples of which classification can occur. In some cases, comparison result may contain a comparison score that represents a degree of match 136 between video resumes. Comparison score may be determined by dynamic time warping (DTW) based on a similarity matrix. Dynamic time warping may include algorithms for measuring similarity between two sequences, which may vary in time or speed. For instance, similarities in walking patterns may be detected, even if in one video the person was walking slowly and if in another he or she were walking more quickly, or even if there were accelerations and deceleration during one observation. DTW has been applied to video, audio, and graphics—indeed, any data that can be turned into a linear representation can be analyzed with DTW. In some cases, DTW may allow processor 104 to find an optimal match between two given sequences (e.g., time series) with certain restrictions. That is, in some cases, sequences can be "warped" non-linearly to match each other. A threshold may be implemented such that the processor 104 would determine that the two video resumes are the same.

With continued reference to FIG. 1, in some embodiments, processor 104 may extract or otherwise recognize at least feature from video resume. Feature may be recognized and/or extracted from image component of video resumes. In some cases, features may be recognized, which are associated with non-verbal content. For example, in some cases, visual non-verbal content such as expression of candidate's emotion may be represented by a number of features which are readily extracted from image component of video resumes. In some cases, recognition and/or extraction of features from image component may include use of machine vision techniques.

Still referring to FIG. 1, in some embodiments, apparatus 100 may include a machine vision process. A machine vision process may use image component from video resume, to make a determination about verbal and/or non-verbal content. For example, in some cases a machine vision process may be used for world modeling or registration of objects within a space. In some cases, registration and/or feature recognition may include image processing, such as without limitation object recognition, feature detection, edge/corner detection, and the like. Non-limiting example of feature detection 128 may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

Still referring to FIG. 1, in some cases, machine vision process may perform pose-estimation for example to ascertain a relative location or movement of objects within existing video resumes to include one or more transformations, for example to a view of a frame (or an image or existing video resumes) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; image recognition and/or edge detection software may be used to detect multiple views of images of an object (from subsequent frames) to derive a relative position along a third (z) axis. In some cases, solicitation video may include a stereo image, having two stereoscopic views, which may be compared to derive z-axis values of points on object permitting, for instance, derivation of further z-axis points within and/or around the object using interpolation. Alternatively, or additionally, relative movement within Image component 116 (e.g., frame to frame) may be used to ascertain positions of objects, even along a z-axis, for instance by way of kinetic parallax. In some cases, relative motion of objects further away may occur at a different speed than objects nearby, this phenomenon may be used to ascertain a position of objects relative a camera, for example when the camera is moving. Object recognition and pose estimation may be repeated with multiple objects in field of view, including without a subject. In an embodiment, x and y axes may be chosen to span a plane common to a field of view of a camera used for solicitation video image capturing and/or an xy plane of a first frame; a result, x and y translational components and q may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

Still referring to FIG. 1, in some cases, a machine vision process may use at least an image classifier, or any classifier described throughout this disclosure. As a non-limiting example, a machine vision process may use an image classifier, wherein the input is image component of video resumes, and through a classification algorithm, outputs image components into categories based on training data, such as sequential video resume frames that match a video resume from a different data set. Processor 104 and/or another device may generate a classifier using a classification algorithm, defined as a process whereby a computing device derives a classifier from training data. Classification may be performed using, without limitation, linear classifiers such as without limitation logistic regression and/or I Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, comparing the assorter-linked data set 124 with the endpoint-linked data set 128 may include recognizing written text. In an embodiment, data sets may include written resumes. Written text may go through a machine-learning process as discussed above. Written resume from the assorter-linked data set 124 may be compared to the endpoint-linked data set 128 to identify similarities and determine if the two candidates are the same. Processor 104 may be configured to recognize at least a keyword as a function of visual verbal content. In some cases, recognizing at least keyword may include optical character recognition. As used in this disclosure, a "keyword" is an element of word or syntax used to identify and/or match elements to each other. In some cases, processor 104 may transcribe much or even substantially all verbal content from a video resume.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword 140 from an image component 116a-b may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to Image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature 128. Exemplary non-limiting features may include corners, edges, lines, closed loops, line direction, line intersections, and the like. In some cases, feature extraction may reduce dimensionality of representation and may make the recognition process computationally more efficient. In some cases, extracted feature 128 may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image components. Since the adaptive classifier may have learned something useful a little too late to recognize characters on the first pass, a second pass is run over the image components. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may be configured to determine, as a function of the comparison result, a duplication coefficient for the video resumes. As used in this disclosure, "duplication coefficient" is a quantitative value of observed similarities between two or more data sets, including video resumes and written resumes. Duplication coefficient may be calculated or computed to provide a measure or metric of similarity between assorter-linked data set 124 and endpoint-linked data set 128. Duplication coefficient could stand for "how much", "how many" or "how often" data appears in video resumes. The different categories of quantitative data could include, measurements, counts, calculations, sensors, projections, quantification of qualitive data, and the like. Other examples, duplication coefficient could measure the number of candidates appearing per video resume. Duplication coefficient could quantify how many candidates answered an interview question. Duplication coefficient could count candidates having similar technical backgrounds in each video resume. Another example, duplication coefficient could calculate the facial match between candidates in each video resume. In an embodiment, duplication coefficient may determine that video resumes are more similar if both candidates in the videos have similar technical backgrounds. In some embodiments, duplication coefficient may include a metric range on a scale of 0, where 0 means the video resumes are not alike, to 10, where 10 is the exact same video. It could also include a range of percentages and may cover any suitable range or rating score. In some cases, determining duplication coefficient data sets may include linear regression analysis, machine-learning process, and the like. For example, duplication coefficient may be calculated by using classifier configured to output at least a datum that labels or otherwise identifies a set of data that are clustered together, found to be close under a distance metric. Additionally, or alternatively, duplication coefficient may be an output of a machine-learning module 120 that generates classifier using a classification algorithm.

Still referring to FIG. 1, processor 104 may utilize the duplication coefficient to output indications regarding data sets, such as informing system 100 that the two candidates are the same. Indications may alternatively or additionally display a degree of similarity to another video and/or video resume, may list one or more video resumes found to be similar as a function of duplication coefficient, or the like. In some cases, processor 104 may utilize the duplication coefficient to identify whether the first and the second candidates are the same candidate.

Additional information on visual and audio comparison is illustrated in U.S. patent application Ser. No. 17/582,070 entitled "APPARATUSES AND METHODS FOR PARSING AND COMPARING VIDEO RESUME DUPLICATIONS" filed on Jan. 24, 2022.

Continuing reference to FIG. 1, processor 104 is configured to determine quantification action 156 as a function of assortment activity 152. In some embodiments, quantification action 156 may be determined as a function of degree of match 136, where degree of match 136 identifies first candidate to be the same as second candidate. For example, and without limitation, quantification action 156 may be initiated by processor 104 after identifying second candidate 148 as first candidate 144. In an embodiment, apparatus 100 may ensure that assorter 108 and endpoint 112 are discussing quantification datum 132 in regard to the same candidate. In one or more embodiments, transfer request 116 may be received by processor 104 in addition to receiving assorter-linked data set and endpoint-linked data set. Receiving transfer request 116 may include posting transfer request data 160 of transfer request 116 on an immutable sequential listing 200. This may ensure that transfer request 116 is unable to be altered such that all parties involved have records of the same assortment activity and quantification datum and/or action. Transfer request 116 may include an explicit or implicit agreement by assorter 108 and endpoint 112 to compensate assorter 108 for one r more assortment activities 152. Transfer request 116 may be digitally signed by transfer initiator. A digital signature may be used to verify the authenticity of quantification datum 132. The transfer initiator may be the endpoint 112 or the assorter 108. Digital signatures and immutable sequential listings are discussed in further detail below. Transfer request 116 includes authenticating the assorter 108 and the endpoint 112. This may include authenticating the devices that they may use to send data sets and transfer requests. In an embodiment, authenticating the assorter 108 and the endpoint 112 may ensure that there are no malicious actors. As used herein, a "malicious actor" is an entity that takes part in actions that cause harm to the cyber realm. The cyber realm, in this instance, may include apparatus 100. In an embodiment, a malicious actor may be an entity (such as a person) acting as the assorter 108 in order to gain access to the quantification data and ultimately, the quantification. Quantification, such as a monetary transaction, may also be posted on the immutable sequential listing.

With continued reference to FIG. 1, authenticating may include authenticating a user identity. A user may be an assorter 108, endpoint 112, candidate, or the like. Authenticating a user identity may include authenticating that a user is the owner of user device. Authenticating may include authenticating a user identity from an authentication datum 140 provided by a user. An authentication datum 140 may be a knowledge factor as a password that only user knows and only user is able to enter when prompted. Authenticating may include validating a user password, passphrase, and/or PIN. Authenticating may include authenticating a possession factor of a user such as authenticating a biometric authentication of a user. Biometric authentication may include any of the biometric authentications described above, for example scanning a user fingerprint, scanning an iris, and/or measuring the gait of a user. Biometric authentication may ensure that a user device is being used by the owner of user device 108. In an embodiment, biometric authentication may be unimodal whereby only one biometric authentication is performed, or biometric authentication may be multimodal whereby two or more biometric authentications are performed. For example, a multimodal authentication may include a fingerprint scan and an iris scan. In an embodiment, multimodal authentication may be simultaneous, whereby two or more biometric authentications are occurring at the same time, or multimodal authentication may be performed in succession, whereby one biometric authentication is performed followed in succession by at least a second biometric authentication.

With continued reference to FIG. 1, authenticating may include calculating a confidence level of a user device. Calculating a confidence level may include calculating a confidence level as a function of the at least a confidence level in authenticity of a user device. Confidence level in identity may be computed, for instance, using one or more statistical measures of reliability of the identification method used; for instance, a user may enter an instruction on a processor 104 providing statistics indicating success rates of various identification methods. Statistics may be collected based, as a non-limiting example, on discoveries of vulnerabilities in particular identification protocols and/or particular instances of secure computation module. A user of system may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise calculating a confidence level as a function of the confidence level in the identity. A device included in system 100 may also determine confidence level in identity as a function of, for instance, one or more algorithms collecting statistics concerning degree of accuracy in past iterations of a particular process for identifying at least a distributed storage node.

With continued reference to FIG. 1, at least a confidence level may include evaluating a biometric authentication of a user and calculating a confidence level to a user device as a function of the biometric authentication of the user. Confidence level in biometric authentication may be computed, for instance, using one or more biometric authentication measures to suggest if a user device is being used by its owner. For instance, a variety of biometric authentication measures to confirm behavior biometrics of a user may be tested, for example speech, voice, signature, keystroke, and/or gait may be measured and analyzed to determine if a user device 108 is being used by its owner. Biometric authentication measures may also employ the use of biometric sensors and scanners that may detect and acquire data necessary for biometric recognition and verification. This may include for example, sensors that may scan and analyze a user face, palm, vein, fingerprint, iris, retina, hand geometry, finger geometry, tooth shape, radiographic dental image, ear shape, olfactory, speech, voice, signature, keystroke dynamics recorder, and/or devices to perform movement signature recognition and/or gait energy images. Biometric sensors may incorporate other tools and technologies such as optical imaging, ultrasonic imaging, and capacitance imaging. In an embodiment, if a variety of biometric authentication measures suggest a user device 108 is being used by its owner, then biometric authentication accuracy may be reduced for a given threshold of transaction or time. For example, biometric authentication of user based on typing behavior, location, and fingerprint recognition may authenticate user as owner of user device 108. This may allow user to complete an asset transfer within a set period of time without having to reauthenticate user at a later stage in time. Alternatively or additionally, biometric authentication of user based on typing behavior, location and fingerprint recognition may authenticate user as owner of user device 108 so that threshold confidence level that may be needed for the remaining transaction may be reduced. For example, at subsequent stages in an asset transfer, user may only need to be authenticated by one biometric authentication, for example by a subsequent typing behavior analysis. Fingerprint recognition may not be necessary for subsequent authentications after being measured initially. In an embodiment, lowered confidence level for the remaining transaction may expire after a certain period of time in an attempt to prevent bad actors from being able to infiltrate system 100 after an initial biometric authentication has been performed.

Still referring to FIG. 1, confidence level may be weighted or modified according to one or more additional factors. For instance, confidence level may be weighted according to how recently at least a user device and/or other device signed a digitally-signed assertion in an authenticated instance of immutable sequential listing 200, where a more recently authenticated assertion may result in a higher confidence level or higher weight assigned to the confidence level, and a less recently authenticated assertion may result in a lower confidence level or a lower weight assigned to that confidence level. As another example, a device that has recently "sold off" a large amount of value and/or has an assertion in a sub-listing currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

Additional information on authorization of user identity is illustrated in U.S. patent application Ser. No. 16/861,699 entitled "SYSTEMS AND METHODS FOR CRYPTOGRAPHIC AUTHORIZATION OF WIRELESS COMMUNICATIONS" filed on Apr. 29, 2020.

Figure 2:
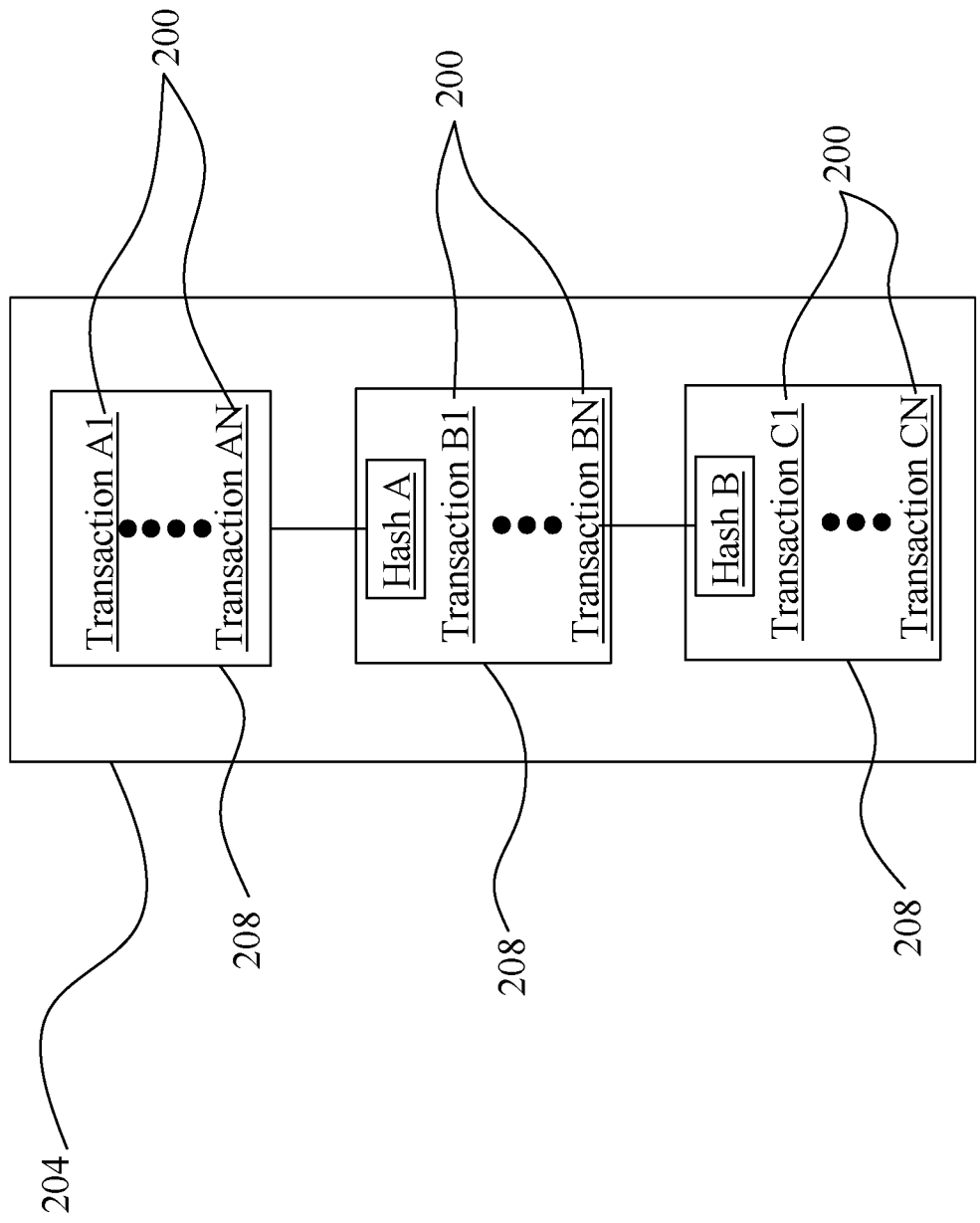
FIG. 2 is a block diagram illustrating an exemplary embodiment of an immutable sequential listing in accordance with one or more embodiments of the present disclosure.

Referring now to FIG. 2, an exemplary embodiment of an immutable sequential listing 200 is illustrated. Data elements are listing in immutable sequential listing 200; data elements may include any form of data, including textual data, image data, encrypted data, cryptographically hashed data, and the like. Data elements may include, without limitation, one or more at least a digitally-signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a processor 104, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any processor 104 may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a posted content as described above.

Figure 3:
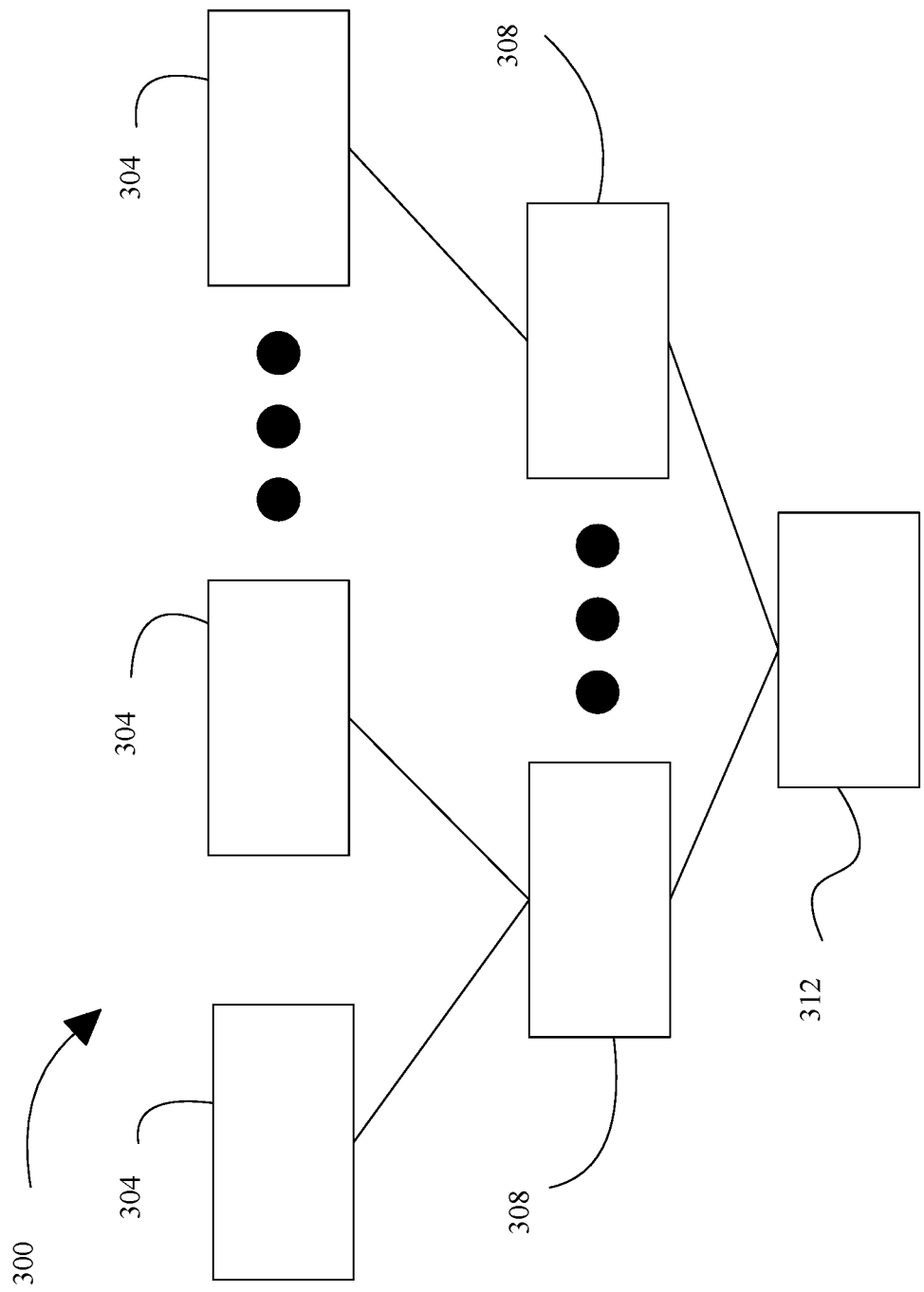
FIG. 3 is a block diagram illustrating an exemplary embodiment of a cryptographic accumulator in accordance with one or more embodiments of the present disclosure.

Turning now to FIG. 3, an exemplary embodiment of a cryptographic accumulator 300 is illustrated. Cryptographic accumulator 300 has a plurality of accumulated elements 304, each accumulated element 304 generated from a lot of the plurality of data lots. Accumulated elements 304 are create using an encryption process, defined for this purpose as a process that renders the lots of data unintelligible from the accumulated elements 304; this may be a one-way process such as a cryptographic hashing process and/or a reversible process such as encryption. Cryptographic accumulator 300 further includes structures and/or processes for conversion of accumulated elements 304 to root 312 element. For instance, and as illustrated for exemplary purposes in FIG. 3, cryptographic accumulator 300 may be implemented as a Merkle tree and/or hash tree, in which each accumulated element 304 created by cryptographically hashing a lot of data. Two or more accumulated elements 304 may be hashed together in a further cryptographic hashing process to produce a node 308 element; a plurality of node 308 elements may be hashed together to form parent nodes 308, and ultimately a set of nodes 308 may be combined and cryptographically hashed to form root 312. Contents of root 312 may thus be determined by contents of nodes 308 used to generate root 312, and consequently by contents of accumulated elements 304, which are determined by contents of lots used to generate accumulated elements 304. As a result of collision resistance and avalanche effects of hashing algorithms, any change in any lot, accumulated element 304, and/or node 308 is virtually certain to cause a change in root 312; thus, it may be computationally infeasible to modify any element of Merkle and/or hash tree without the modification being detectable as generating a different root 312. In an embodiment, any accumulated element 304 and/or all intervening nodes 308 between accumulated element 304 and root 312 may be made available without revealing anything about a lot of data used to generate accumulated element 304; lot of data may be kept secret and/or demonstrated with a secure proof as described below, preventing any unauthorized party from acquiring data in lot.

Continuing to refer to FIG. 3, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Alternatively or additionally, and still referring to FIG. 3, cryptographic accumulator 300 may include a "vector commitment" which may act as an accumulator in which an order of elements in set is preserved in its root 312 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 300 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root. of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Referring now to FIG. 4, an exemplary embodiment of a machine-learning module 120 that may perform one or more machine-learning processes as described in this disclosure is illustrated. Machine-learning module 120 may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a processor 104/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 120 may correlate any input data as described in this disclosure to any output data as described in this disclosure. As a non-limiting illustrative inputs may include subject-specific data and outputs may include description-specific data.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 120 may generate a classifier using a classification algorithm, defined as a processes whereby a processor 104 and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to according to fields of job description for instance, title, role, organization, requisite experience, requisite credentials, and the like.

Still referring to FIG. 4, machine-learning module 120 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include subject-specific data as described above as inputs, description-specific data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 120 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
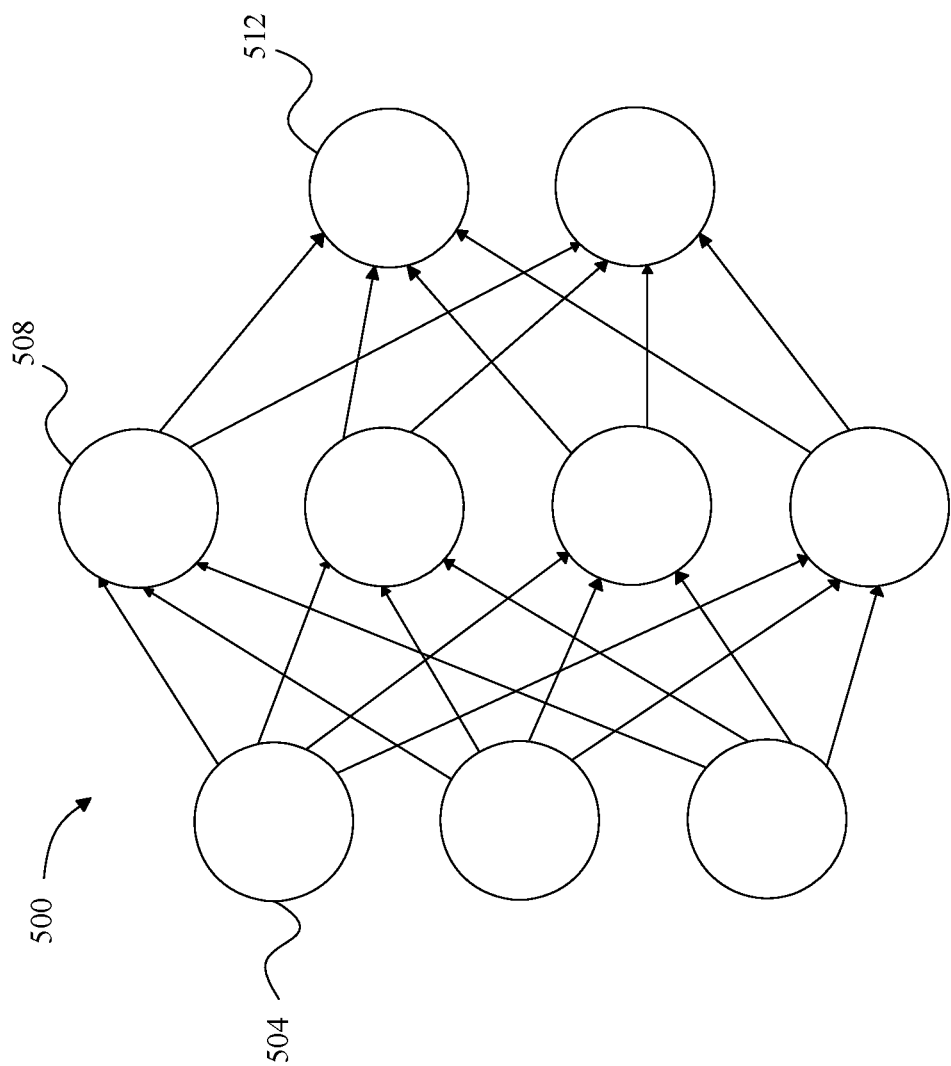
FIG. 5 illustrates an exemplary neural network in accordance with one or more embodiments of the present disclosure.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 6:
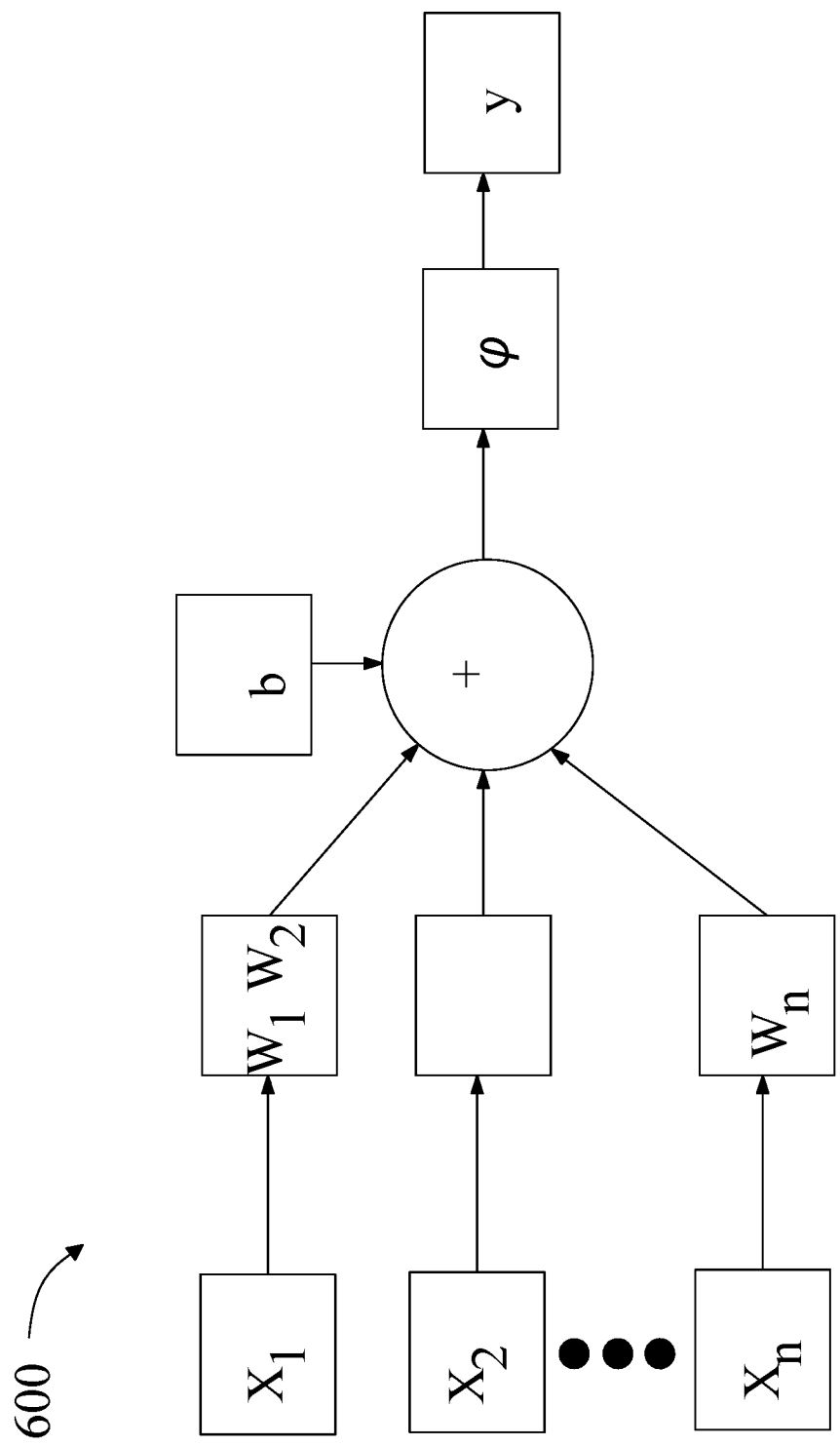
FIG. 6 is a block diagram of an exemplary node in accordance with one or more embodiments of the present disclosure.

Referring now to FIG. 6, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
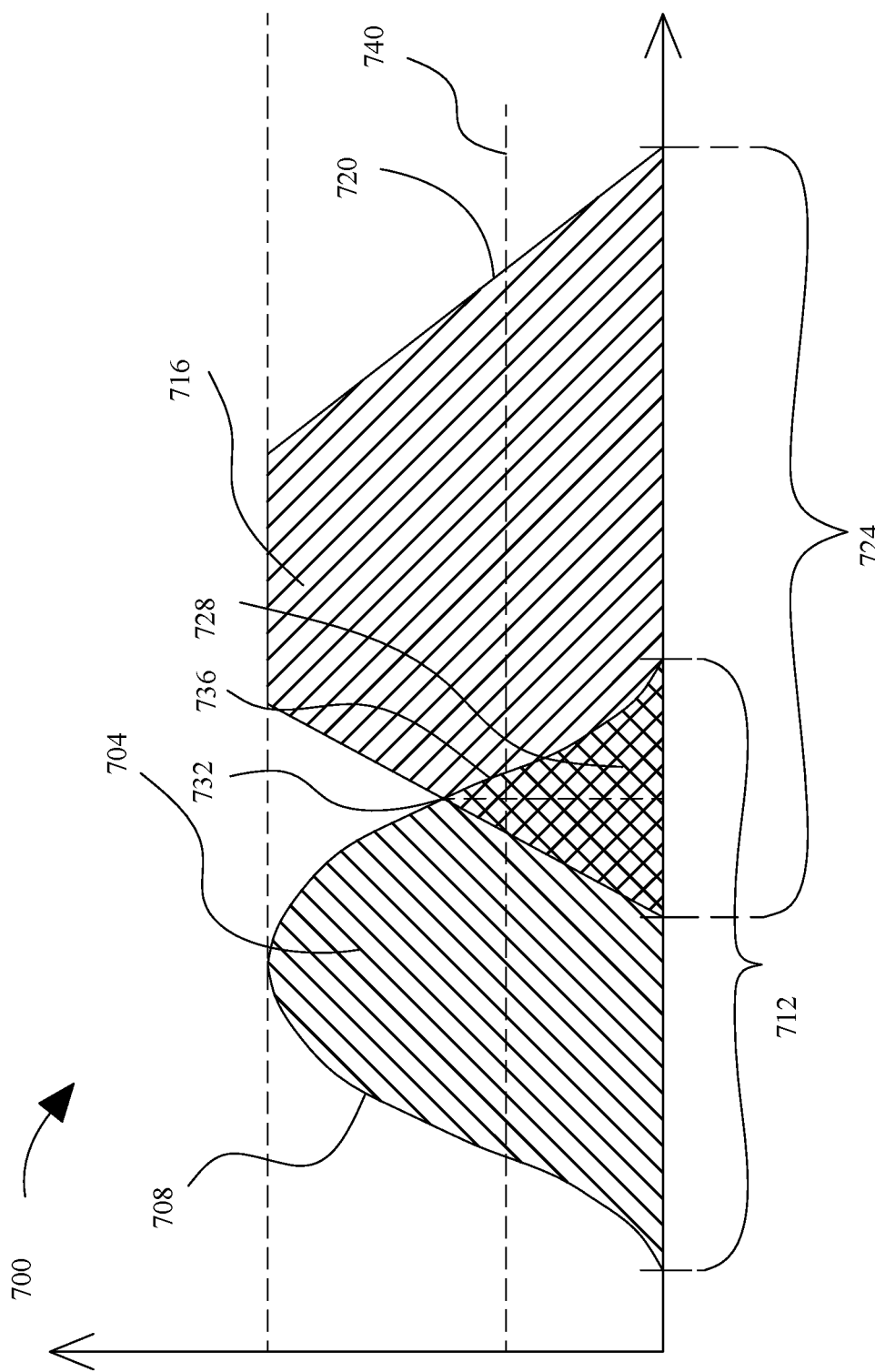
FIG. 7 is a graph illustrating an exemplary relationship between fuzzy sets in accordance with one or more embodiments of the present disclosure.

Referring to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more processes (e.g., machine-learning models), subject-specific data, and description-specific data. A second fuzzy set 716, which may represent any value which may be represented by first fuzzy set 704, may be defined by a second membership function 720 on a second range 724. Second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models and/or subject-specific data and a predetermined class, such as without limitation a job description, for combination to occur as described above. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify an assortment activity with, for example, a quantification. For instance, if data assorter-linked data and/or endpoint linked-data has a fuzzy set matching an assortment activity fuzzy set by having a degree of overlap exceeding a threshold, computing device may classify the subject as being relevant or otherwise associated with a specific quantification. Where multiple fuzzy matches are performed, degrees of match for each respective fuzzy set may be computed and aggregated through, for instance, addition, averaging, or the like, to determine an overall degree of match.

Still referring to FIG. 7, in an embodiment, assortment data may be compared to multiple class fuzzy sets representing quantification actions. For instance, assortment data may be represented by an individual fuzzy set that is compared to each of the multiple class fuzzy sets; and a degree of overlap exceeding a threshold between the individual fuzzy set and any of the multiple class fuzzy sets may cause computing device to classify assortment data as belonging to a quantification. For instance, in one embodiment there may be two class fuzzy sets, representing an quantification action and a second quantification action. First quantification action may have a first fuzzy set; second quantification action may have a second fuzzy set; and assortment data may have an individual fuzzy set. Computing device, for example, may compare an individual fuzzy set with each of first fuzzy set and second fuzzy set, as described above, and classify an assortment datum to either, both, or neither of first quantification action nor second quantification action. Machine-learning methods as described throughout may, in a non-limiting example, generate coefficients used in fuzzy set equations as described above, such as without limitation x, c, and a of a Gaussian set as described above, as outputs of machine-learning methods. Likewise, subject-specific data may be used indirectly to determine a fuzzy set, as the fuzzy set may be derived from outputs of one or more machine-learning models that take the subject-specific data directly or indirectly as inputs. Although an exemplary application for fuzzy set matching is described above, fuzzy set matching may be used for any classifications or associations described within this disclosure.

Still referring to FIG. 7, a computing device may use a logic comparison program, such as, but not limited to, a fuzzy logic model to determine a quantification action. A quantification action may include, but is not limited to, quantification action levels, such as partial payment, full payment, no payment, and the like; each such quantification action may be represented as a value for a linguistic variable representing quantification action, or in other words a fuzzy set as described above that corresponds to a degree of quantification action as calculated using any statistical, machine-learning, or other method that may occur to a person skilled in the art upon reviewing the entirety of this disclosure. In other words, a given element of assortment activity may have a first non-zero value for membership in a first linguistic variable value such as "incomplete", and a second non-zero value for membership in a second linguistic variable value such as "completed". In some embodiments, determining a quantification action may include using a linear regression model. A linear regression model may include a machine-learning model. A linear regression model may be configured to map data of assortment activity, such as assorter-linked data sets to one or more endpoint-linked data sets. A linear regression model may be trained using assortment activity training data. A linear regression model may map statistics. In some embodiments, determining a quantification action of assortment activity may include using a quantification classification model. A quantification classification model may be configured to input collected data and cluster data to a centroid based on, but not limited to, frequency of appearance, linguistic indicators of quantification action, and the like. Centroids may include scores assigned to them elements of assortment activity, such as assorter-linked data and/or endpoint-linked data, may each be assigned a score. In some embodiments, a quantification classification model may include a K-means clustering model. In some embodiments, a quantification classification model may include a particle swarm optimization model. In some embodiments, determining a quantification action of assortment activity may include using a fuzzy inference engine. A fuzzy inference engine may be configured to map one or more assortment activity data elements using fuzzy logic. In some embodiments, a plurality of entity assessment devices may be arranged by a logic comparison program into quantification action arrangements. An "quantification arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given quantification action level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 7, an inference engine may be implemented according to input and/or output membership functions and/or linguistic variables. For instance, a first linguistic variable may represent a first measurable value pertaining to an input element of assortment activity, such as a degree of completion of an element of assortment activity, while a second membership function may indicate a degree of incompletion of a subject thereof, or another measurable value pertaining to assortment activity, such as a degree of comparison between assorter-linked data set and endpoint-linked data set. Continuing the example, an output linguistic variable may represent, without limitation, a score value. An inference engine may combine rules, such as: "if the difficulty level is 'hard' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 7, assortment activity to be used may be selected by user selection, and/or by selection of a distribution of output scores, such as 30% similarity, 40% completion, or the like. Each score may be selected using an additional function such as degree of completion and/or similarity, as described above.

Figure 8:
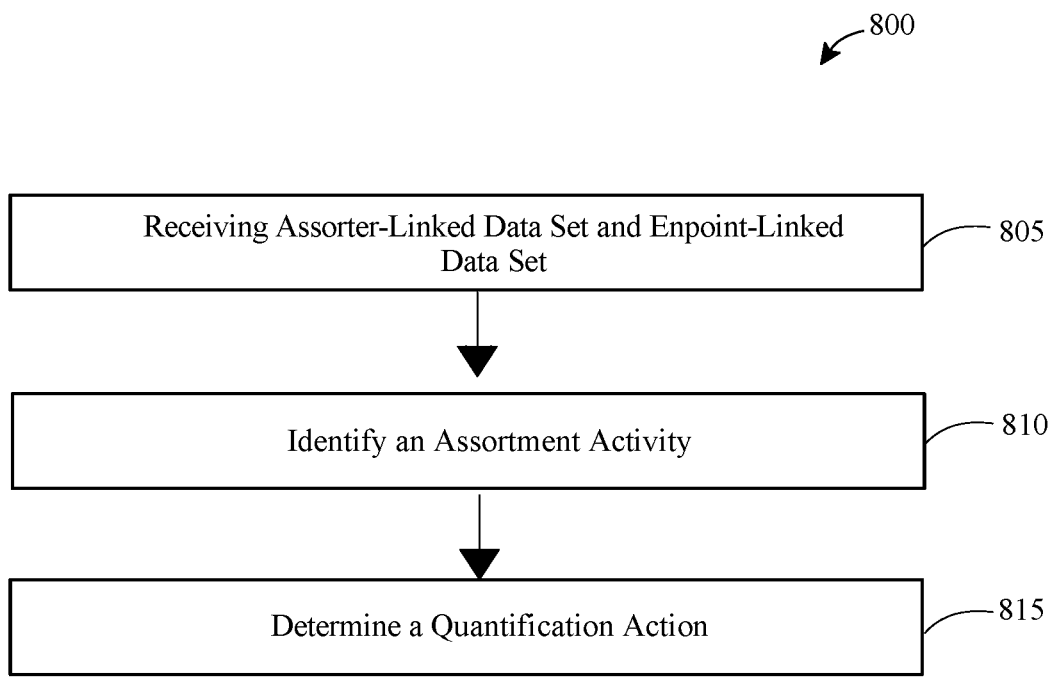
FIG. 8 is a flow diagram illustrating an exemplary embodiment of a method for candidate tracking in accordance with one or more embodiments of the present disclosure.

Referring now to FIG. 8, an exemplary embodiment of method 800 of assorter quantification is shown. Step 805 of method 800 includes receiving assorter-linked data set 124 associated with a first candidate 144 and endpoint-linked data set 128 with a second candidate 148. The assorter-linked data set 124 may include written or video resumes, and the like. The data set may include first candidate information such as candidate-associated data. This may be implemented, without limitation, as described above in reference to FIGS. 1-7. Endpoint-linked data set 128 may include similar information as the assorter-linked data set 124. This may be implemented, without limitation, as described above in reference to FIGS. 1-7.

Still referring to FIG. 8, step 810 of method 800 includes identifying an assortment activity as a function of the assorter-linked data set 124 associated with a first candidate 144 and endpoint-linked data set 128 with a second candidate 148. Assortment activity may include verified activities completed, partially completed, or not completed by assorter 108. Assortment activities may be done on behalf of endpoint 112, such as interviewing or referring a candidate to endpoint 112. Method 800 may include identifying the second candidate 148 as the first candidate 144. In an embodiment, processor may utilize comparison result of the two data sets to determine that the two candidates are the same. This may be implemented, without limitation, as described above in reference to FIGS. 1-7. Identifying an assortment activity may include determining a degree of match 136 between assorter-linked data set 124 and endpoint-linked data set 128. Degree of match 136 may include a comparison and comparison score between the two data sets. In an embodiment, this may include comparing video resumes of the two data sets to identify a job application. This may be implemented, without limitation, as described above in reference to FIGS. 1-7.

Step 815 of method 800 includes determining quantification action as a function of assortment activity. Quantification action may include an action of paying and/or rewarding an assorter for recruiting actions and or activities. In an embodiment, processor may initiate quantification action, which may include an action such as payment of an assorter 10 for, for example and without limitation, completed and/or partially completed assortment activity. This may be implemented, without limitation, as described above in reference to FIGS. 1-7. Method 800 may further include processor receiving and processing transfer request 116, wherein receiving transfer request 116 includes authenticating assorter 108 and endpoint 112. This may be implemented, without limitation, as described above in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
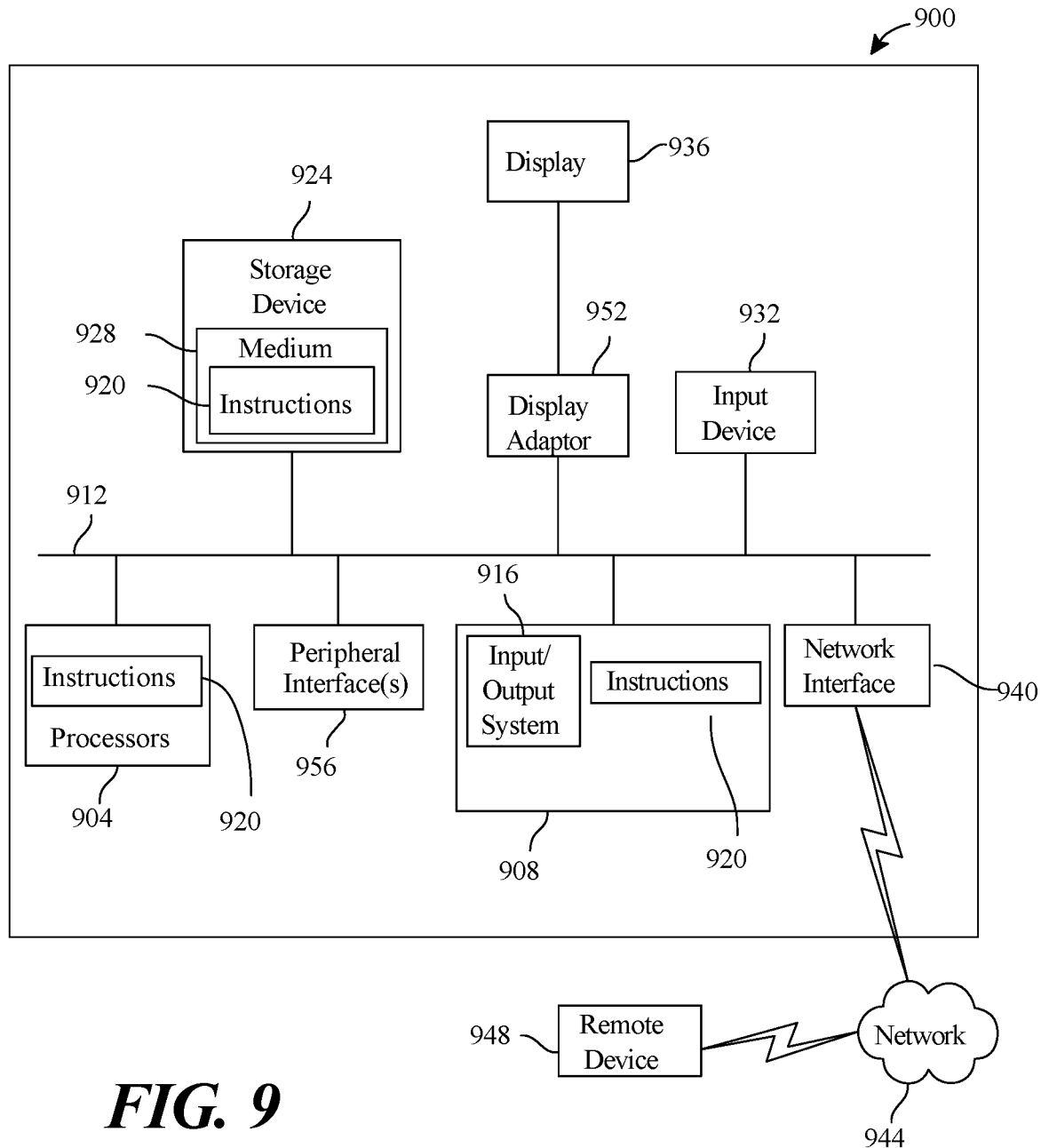
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 982 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 982 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 986. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for assorter quantification, the apparatus comprising:
   at least a processor; and
   a memory communicatively connected to the at least a processor and including instructions configuring the at least a processor to:
   receive a transfer request, wherein receiving the transfer request comprises authenticating the assorter and the endpoint, wherein authenticating the transfer request comprises authenticating an endpoint identity of the endpoint by a biometric authentication, wherein authenticating an endpoint identity comprises:
receive a fingerprint scan from a biometric sensor associated with the endpoint and authenticating the fingerprint scan received from the endpoint to authenticate the endpoint identity;
scan a user fingerprint as a function of a fingerprint biometric sensor;
scan a user face as a function of a facial biometric sensor;
identify a user typing behavior using a video capture device;
authenticate an assorter identity as a function of the fingerprint scan, the user face scan and the user typing behavior wherein authenticating the user comprises:
calculating a confidence level for the assorter identity, wherein calculating the confidence level further comprises a statistical measure of reliability; and
comparing the confidence level to an authentication threshold;
receive an assorter-linked data set associated with an assorter and an endpoint-linked data set associated with an endpoint;
identify an assortment activity as a function of the assorter-linked data set and the endpoint-linked data set; and
determine a quantification action as a function of the assortment activity, wherein determining a quantification action comprises:
training a machine learning model as a function of training data and a machine learning algorithm, wherein training the machine learning model further comprises:
generating a degree of match between at least two pairs of fuzzy sets, using a classifier derived from training data, wherein multiple fuzzy matches can be performed, wherein the training data further comprises at least an assortment activity input and outputs at least a quantification action, wherein outputting at least a quantification action further comprises applying weighted values to the at least an assortment activity input and correlating the weighted values of the at least an assortment activity to adjacent layers of the at least a quantification action;
computing an overall degree of match by averaging the degree of match between the at least two pairs of fuzzy sets to measure similarity between the assorter-linked data set and the endpoint-linked data set; and
generating, using the trained machine learning model, the quantification action; and
transferring a payment to the assorter as a function of the quantification action.

2. The apparatus of claim 1, wherein processing the transfer request comprises digitally signing the transfer request.

3. The apparatus of claim 1, wherein processing the transfer request further comprises entering the quantification data on an immutable sequential listing.

4. The apparatus of claim 1, wherein the assortment activity comprises referring a candidate to the endpoint.

5. The apparatus of claim 1, wherein the processor is further configured to determine a quantity associated with the quantification action by weighting the assortment activity.

6. The apparatus of claim 1, wherein the processor is further configured to:
receive the assorter-linked data set associated with a first candidate and the endpoint-linked data set associated with a second candidate; and
determine a degree of match between a first candidate and a second candidate as a function of the assorter-linked data set and the endpoint-linked data set; and
identify the second candidate as the first candidate as a function of the degree of match.

7. The apparatus of claim 6, wherein a classifier is used to determine the degree of match between the assorter-linked data set and the endpoint-linked data set.

8. The apparatus of claim 1, wherein the assorter-linked data set and the endpoint-linked data set are posted on an immutable sequential listing.

9. The apparatus of claim 1, wherein the quantification action comprises quantification data.

10. The apparatus of claim 9, wherein the quantification data is generated using a machine-learning module.

11. The apparatus of claim 1, wherein the biometric authentication comprises scanning an iris.

12. The apparatus of claim 1, wherein the biometric authentication is multimodal.

13. A method for assorter quantification, the method comprising:
receiving a transfer request, wherein receiving the transfer request comprises authenticating the assorter and the endpoint, wherein authenticating the transfer request comprises authenticating an endpoint identity of the endpoint by a biometric authentication, wherein authenticating an endpoint identity comprises:
receiving a fingerprint scan from a biometric sensor associated with the endpoint and authenticating the fingerprint scan received from the endpoint to authenticate the endpoint identity;
scanning, by a fingerprint biometric sensor, a user fingerprint;
scanning a user face, by a facial biometric sensor, as a function of a facial biometric sensor;
identifying a user typing behavior, by a video capture device;
authenticating, by a processor, an assorter identity as a function of the fingerprint scan, the user typing behavior and the user face scan, wherein authenticating the user comprises:
calculating a confidence level for the assorter identity wherein calculating the confidence level further comprises a statistical measure of reliability; and
comparing the confidence level to an authentication threshold;
receiving, by the processor, an assorter-linked data set associated with an assorter and an endpoint-linked data set associated with an endpoint;
identifying, by the processor, an assortment activity as a function of the assorter-linked data set and the endpoint-linked data set; and
determining, by the processor, a quantification action as a function of the assortment activity, wherein determining a quantification action comprises:

training a machine learning model as a function of training data and a machine learning algorithm, wherein training the machine learning model further comprises:
  generating a degree of match between at least two pairs of fuzzy sets, using a classifier derived from training data, wherein multiple fuzzy matches can be performed, wherein the training data further comprises at least an assortment activity input and outputs at least a quantification action, wherein outputting at least a quantification action further comprises applying weighted values to the at least an assortment activity input and correlating the weighted values of the at least an assortment activity to adjacent layers of the at least a quantification action;
  computing an overall degree of match by averaging the degree of match between the at least two pairs of fuzzy sets to measure similarity between the assorter-linked data set and the endpoint-linked data set; and
  generating, using the trained machine learning model, the quantification action; and
transferring a payment to the assorter as a function of the quantification action.

14. The method of claim 13, wherein processing the transfer request further comprises entering the action datum on an immutable sequential listing.

15. The method of claim 13, wherein processing the transfer request further comprises entering the quantification data on an immutable sequential listing.

16. The method of claim 13, wherein the assortment activity comprises referring a candidate to the endpoint.

17. The method of claim 13, further comprising determining a quantity associated with the quantification action by weighting the assortment activity.

18. The method of claim 13, further comprising:
  receiving the assorter-linked data set associated with a first candidate and the endpoint-linked data set associated with a second candidate; and
  determining a degree of match between a first candidate and a second candidate as a function of the assorter-linked data set and the endpoint-linked data set; and
  identifying the second candidate as the first candidate as a function of the degree of match.

19. The method of claim 13, wherein the biometric authentication comprises scanning an iris.

* * * * *